US010462120B2

(12) United States Patent
Benayed

(10) Patent No.: US 10,462,120 B2
(45) Date of Patent: Oct. 29, 2019

(54) AUTHENTICATION SYSTEM AND METHOD

(71) Applicant: BARCLAYS SERVICES CORPORATION, New York, NY (US)

(72) Inventor: Mohamed Karim Benayed, Clifton, NJ (US)

(73) Assignee: BARCLAYS SERVICES CORPORATION, New York, NY (US)

( * ) Notice: Subject to any disclaimer, the term of this patent is extended or adjusted under 35 U.S.C. 154(b) by 337 days.

(21) Appl. No.: 15/604,867

(22) Filed: May 25, 2017

(65) Prior Publication Data

US 2018/0343246 A1   Nov. 29, 2018

(51) Int. Cl.
*G06F 21/30*   (2013.01)
*H04L 29/06*   (2006.01)
(Continued)

(52) U.S. Cl.
CPC ........ *H04L 63/0815* (2013.01); *G06F 21/316* (2013.01); *G06F 21/41* (2013.01);
(Continued)

(58) Field of Classification Search
CPC .......... H04L 63/08; H04L 63/10; G06F 21/30
See application file for complete search history.

(56) References Cited

U.S. PATENT DOCUMENTS 7,178,025 B2   2/2007  Scheidt et al.
8,583,809 B2 * 11/2013  Sherkin ............... H04L 63/0823
                                                        709/224

(Continued)

OTHER PUBLICATIONS

International Patent Application No. PCT/US2017/034386, Notification of Transmittal of the International Search Report and the Written Opinion of the International Searching Authority, dated Aug. 4, 2017, 14 pages.

(Continued)

*Primary Examiner* — Izunna Okeke
(74) *Attorney, Agent, or Firm* — Morgan, Lewis & Bockius LLP

(57) ABSTRACT

Data describing a request to access a computer program is received at a processing component from a requesting device operated by an end user. The processing component determines whether an existing authentication session for the end user exists. In accordance with a determination that the existing authentication session for the end user does not exist, the end user is prompted to authenticate to the processing component. In accordance with a determination that the existing authentication session for the end user exists, a risk assessment is performed. The risk assessment comprises a consideration of one or both of (i) one or more request characteristics associated with the request to access the computer program and (ii) one or more computer program access criteria. In accordance with a determination that risk assessment is positive, the requesting device is provided with access to the computer program. In accordance with a determination that risk assessment is negative, the end user is prompted to perform an authentication activity. In response to receiving data indicating that the end user performed the authentication activity, and the authentication activity is successful, a new authentication session is established for the end user and the requesting device is provided with access to the computer program.

28 Claims, 4 Drawing Sheets

(51) Int. Cl.
*G06F 21/41* (2013.01)
*G06F 21/62* (2013.01)
*H04L 9/32* (2006.01)
*G06F 21/31* (2013.01)
*G06F 21/33* (2013.01)

(52) U.S. Cl.
CPC .............. *G06F 21/62* (2013.01); *H04L 9/321* (2013.01); *H04L 9/3226* (2013.01); *H04L 9/3228* (2013.01); *H04L 9/3231* (2013.01); *H04L 9/3263* (2013.01); *G06F 21/33* (2013.01); *H04L 9/32* (2013.01); *H04L 63/0807* (2013.01); *H04L 63/0823* (2013.01); *H04L 63/0838* (2013.01); *H04L 63/102* (2013.01); *H04L 63/107* (2013.01); *H04L 63/108* (2013.01)

(56) References Cited

U.S. PATENT DOCUMENTS

| | | | |
|---|---|---|---|
| 9,015,485 B1* | 4/2015 | Johansson | H04L 63/083 713/168 |
| 2003/0163733 A1 | 8/2003 | Barriga-Caceres et al. | |
| 2007/0101405 A1* | 5/2007 | Engle | H04L 63/0272 726/4 |
| 2013/0173915 A1 | 7/2013 | Haulund | |
| 2014/0082715 A1 | 3/2014 | Grajek et al. | |
| 2014/0365781 A1* | 12/2014 | Dmitrienko | G06F 21/34 713/185 |
| 2016/0021117 A1 | 1/2016 | Harmon et al. | |
| 2016/0087957 A1 | 3/2016 | Shah et al. | |

OTHER PUBLICATIONS

Corella et al., A Comprehensive Apprach to Crytographic and Biometric Authentication from a Mobile Perspective, Executive Summary, Apr. 20, 2013, 84 pages.

Tillotson et al, "BIO-key Biometric Service Provider for IBM Security Access Manager for Enterprise Single Sign-On," IBM Redbooks, Jul. 18, 2012, 20 pages.

Pomcor, "Two Methods of Cryptographic Single Sign-On on Mobile Devices", http://pomcor.com/2013/04/20/two-methods-of-cryptographic--single-sign-on-on-mobile-devices/, Apr. 20, 2013, accessed Nov. 29, 2016, 6 pages.

Sy et al, "Generation of Cryptographic Keys from Personal Biometrics: An Illustration Based on Fingerprints", Intech, 2012, 30 pages.

Corella et al., "A Comprehensive Approach to Cryptographic and Biometric Authentication from a Mobile Perspective", Apr. 20, 2013, 84 pages.

Corella, "Two Methods of Cryptographic Single Sign-On on Mobile Devices", https://pomcor.com/2013/04/20/twomethodsofcryptographicsinglesignononmobiledevices/, Pomcor.com, Apr. 20, 2013, 5 pages.

Tillotson et al., "BIO-Key Biometric Service Provider for IBM Security Access Manager for Enterprise Single Sign-On", IBM Redbooks, Jul. 2012, 20 pages.

Sy et al., "Generation of Cryptographic Keys from Personal Biometrics: An Illustration Based on Fingerprints", New Trends and Development in Biometrics, 2012, 29 pages.

* cited by examiner

AUTHENTICATION SYSTEM AND METHOD

FIELD OF THE INVENTION

The present invention generally relates to authenticating end user access to computer programs across multiple devices using single sign-on techniques.

SUMMARY

In one embodiment, there is a system and method for performing enhanced authentication.

Data describing a request to access a computer program is received at a processing component from a requesting device operated by an end user. The processing component determines whether an existing authentication session for the end user exists. In accordance with a determination that the existing authentication session for the end user does not exist, the end user is prompted to authenticate to the processing component. In accordance with a determination that the existing authentication session for the end user exists, a risk assessment is performed. The risk assessment comprises a consideration of one or both of (i) one or more request characteristics associated with the request to access the computer program and (ii) one or more computer program access criteria. In accordance with a determination that risk assessment is positive, the requesting device is provided with access to the computer program. In accordance with a determination that risk assessment is negative, the end user is prompted to perform an authentication activity. In response to receiving data indicating that the end user performed the authentication activity, and the authentication activity is successful, a new authentication session is established for the end user and the requesting device is provided with access to the computer program.

The data indicating that the end user performed the authentication activity may comprise biometric data of the end user; a password selected by the end user; and/or a one-time password provided by the processing component after receiving the request to access from the requesting device.

In some embodiments, the processing component receives a registration request from the end user. The processing component creates a unique registration token. The processing component creates a database record including an identifier for the end user and the unique registration token. The processing component provides to a registration device a mechanism to access an authentication application for initiating registration of the registration device. The identifier for the end user and the unique registration token are received through the authentication application from the end user. An identifier associated with the registration device is collected. A public key is received from the registration device. The public key forms a portion of a cryptographic key pair, the cryptographic key pair being created upon the end user authenticating to the registration device. The registration device stores a private key of the cryptographic key pair. The processing component calculates a device authentication weight, which is stored in a database along with the public key.

In some embodiments, the authentication session for the end user is established using the registration device before the request to access the computer program is received.

In some embodiments, the requesting device is the registration device and, in other embodiments, is a different device.

In some embodiments, the consideration of the computer program access criteria dictate that the determination of the risk assessment is negative, regardless of the consideration of the request characteristics.

In some embodiments, the consideration of the request characteristics dictate that the determination of the risk assessment is negative, regardless of the consideration of the computer program access criteria.

The computer program access criteria may comprise a minimum authentication weight associated with the computer program, which may be determined based on a criticality of the computer application.

The request characteristics may comprise one or more of the device authentication weight; a location of the requesting device; a time that has elapsed since the existing authentication session was established; and whether the registration device is the same device used to make the access request.

The device authentication weight may be calculated based on a modality by which the end user authenticates to the registration device, and/or a security assessment of the registration device.

In some embodiments, the processing component receives the public key in connection with the end user performing the authentication activity.

In some embodiments, a request to access a resource within the computer program is received at the processing component and it is determined whether one or more request characteristics meet one or more computer program resource access criteria. The one or more computer program resource access criterial comprise a minimum authentication weight associated with the resource.

In some embodiments, the existing authentication session is established in connection with the end user accessing another computer program that is not the subject of the request to access. In such an embodiment, the one or more request characteristics may include a modality in which the existing authentication session in connection with accessing the other computer program was established.

In certain embodiments, the computer program may be a native application; a web-based application; or an operating system of the requesting device.

In some embodiments, the consideration of the request characteristics and computer program access criteria dictate that the determination of the risk assessment is negative when the device authentication weight does not exceed a minimum authentication weight associated with the computer program.

In some embodiments, the consideration of the request characteristics and computer program access criteria dictate that the determination of the risk assessment is negative when a distance between a first location of the requesting device when the request to access was sent and a second location of another device when the existing authentication session was created exceeds a distance threshold.

In some embodiments, the consideration of the request characteristics and computer program access criteria dictate that the determination of the risk assessment is negative when a time period between a first time when the request to access was sent and a second time when the existing authentication session was created exceeds a time period threshold.

BRIEF DESCRIPTION OF THE SEVERAL VIEWS OF THE DRAWINGS

The foregoing summary, as well as the following detailed description of embodiments of the invention, will be better understood when read in conjunction with the appended drawings of an exemplary embodiment. It should be understood, however, that the invention is not limited to the precise arrangements and instrumentalities shown.

In the drawings.

DETAILED DESCRIPTION

Organizations and end users face multiple challenges in the authentication space. Users are required to memorize multiple passwords to access the computer programs (e.g., applications, operating systems of devices etc.) they use every day. This burden is compounded to the extent users need to access multiple computer programs on multiple devices (e.g., via a mobile device while traveling, as well as via their desktop upon arrival at work or other destination). As a result, password resets are on the rise, which are costly for organizations to implement and maintain. Additionally, mobile applications are proliferating within organizations. This further adds to the complexity of password resets and the tremendous risk facing organizations if a single application or system is compromised. In view of the foregoing, there exists a need in the art for a system that provides end users with convenience and flexibility in accessing computer programs and provides organizations with required security.

Embodiments of the present invention provide novel improvements in the field of authentication technology and are particularly useful in identity and access management systems. More specifically, embodiments of the present invention provide a platform that allows users to log on to any of multiple, distinct clients (e.g., mobile, desktop, services/capabilities), and access computer programs (e.g., native mobile applications, desktop applications, web/cloud-based applications, authentication set-ups, operating systems, services or capabilities), using single sign-on functionality (i.e., a single log in (e.g., username/password, touch identification)). In an exemplary embodiment, the invention uses biometrics (although biometrics need not be used in all embodiments of the invention), authentication, and cryptography components to enable a capability in which a user's identity (e.g., biometric identity), or signature, remains anonymous while a cryptographic key relationship is used to authenticate the user. A risk engine is also provided in preferred embodiments to control the single sign-on functionality based on various risk factors, such as time, number of devices, and/or geolocation, by way of example.

Figure 1:
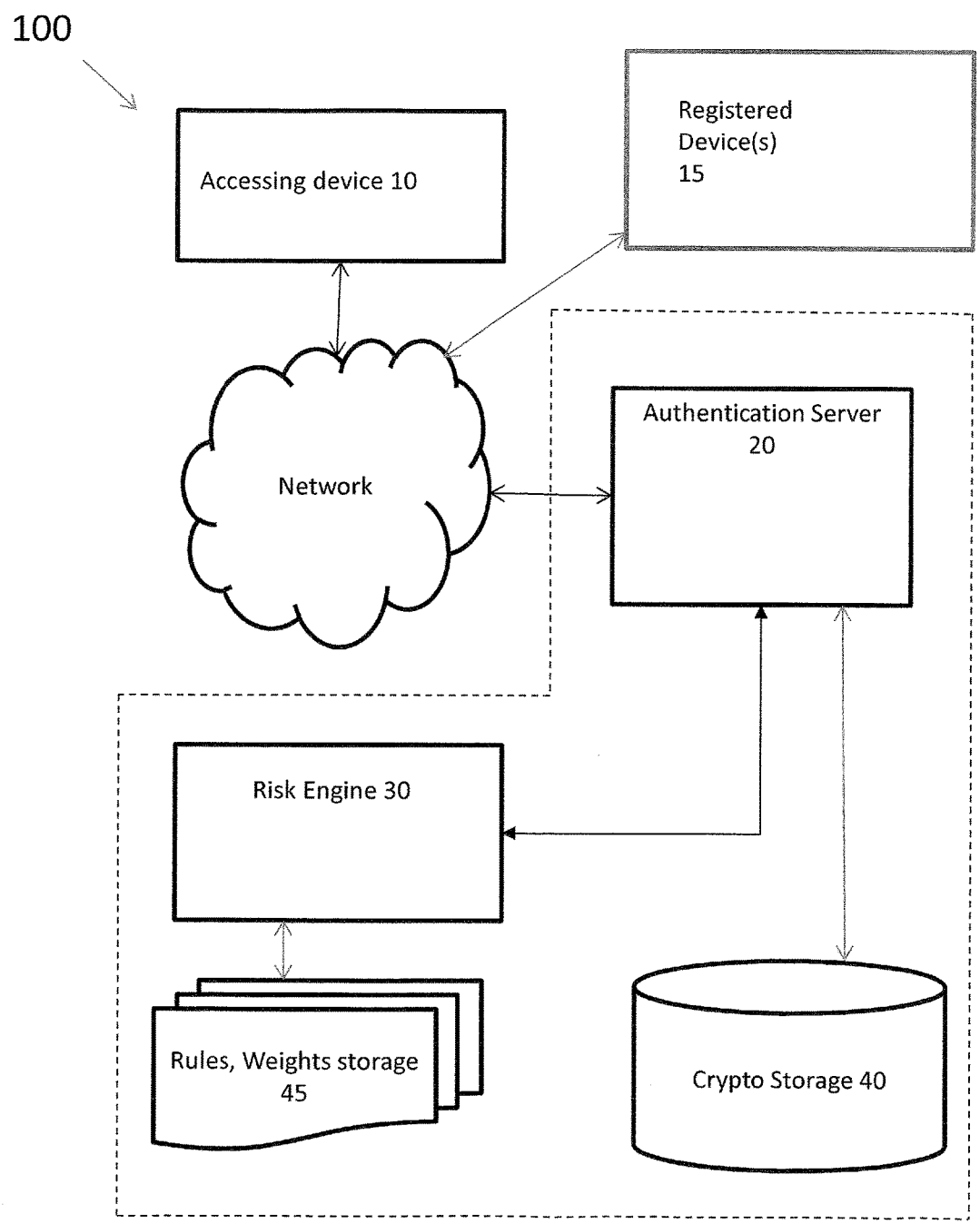
FIG. 1 is a diagram illustrating exemplary hardware and software components that may be used in connection with an exemplary embodiment of the present invention.

A detailed description of exemplary embodiments of the invention is now described. FIG. 1 is a diagram of a system 100 illustrating exemplary hardware and software components that may be used in connection with an embodiment of the present invention. Device 10 is any device seeking access to a computer program. Device(s) 15 comprise the devices that are registered with processing component 20. The illustrated network is a communication network allowing the components of system 100 to communicate and exchange data. Processing component 20 performs the authentication activities described herein. Processing component 20 may be a computer server in an exemplary embodiment and, as such, is also referred to herein as authentication server 20. Risk engine 30 comprises a computer processor that is programmed to perform the risk assessment activities described herein. Rules/weights storage 45 comprises a data storage/retrieval mechanism for the rules and weights used by the risk engine 30. Cryptographic storage 40 stores data associated with the cryptographic keys used in connection with the present invention.

Figure 2A:
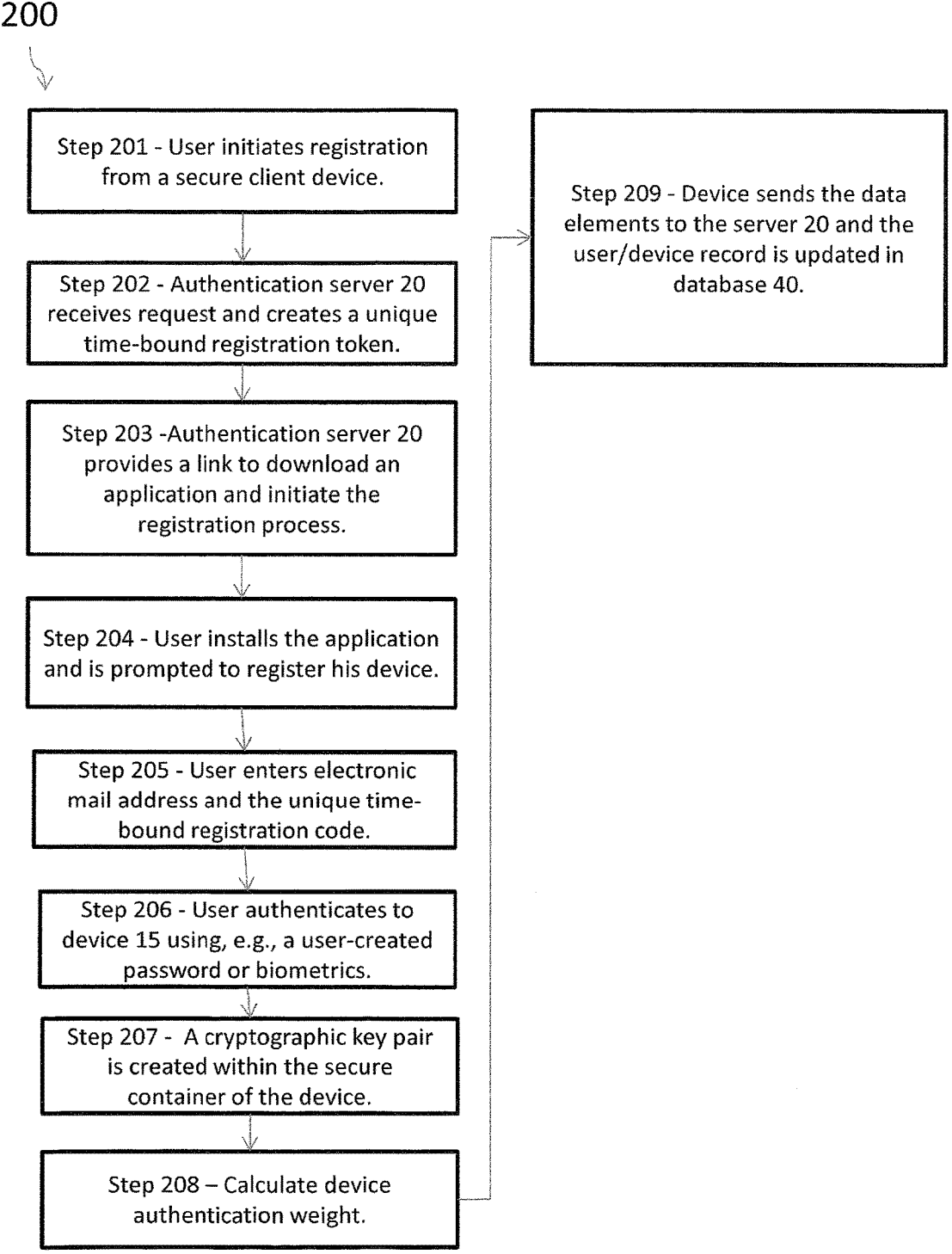
FIG. 2A is a diagram illustrating the flow of data and communications between and among devices and other computer system components in connection with an exemplary registration process of the present invention.

With reference to FIG. 2A, an exemplary method 200 by which an end user may register with the system, including registering his device(s) 15 with the system, is described. In step 201, the user initiates registration from a secure client device. More particularly, the user may initiate registration from a trusted work desktop or other authenticated environment with an existing authentication session (i.e., from a trusted device which was already registered and which the user is logged into or from an authorized desktop which the user is logged into). In step 202, the authentication server 20 receives the request to commence registration and creates a unique time-bound registration token (e.g., a one-time pin or password, or a QR Code, by way of example). Authentication server 20 creates a database record including, for example, an identifier for the user, such as an electronic mail address of the user, and the unique time-bound registration code. In step 203, authentication server 20 sends to the user an electronic message, e.g., using a secure email address, that includes a link to download an application and initiate the registration process. As described more fully herein, the application acts as the authentication broker and is secured, e.g., with biometrics, to unlock access to a private key. Alternatively, the link to download the application may be displayed to the user on a screen within the secure session. Accordingly, in any number of ways, the user is provided with access to the application so he can install it on the device. Thus, in step 204, using the link, the user installs the application and, through the application, is prompted to register his device. In step 205, the user enters the identifier for the user, e.g., his electronic mail address, and the unique time-bound registration code. Additional data may be collected, e.g., the identifier of the device performing the registration and the location of such device at the time of registration. At this point, the authenticity and ownership of the device 15 sought to be registered by the user are confirmed, as well as the user's association with the authenticated session on the device employed by the user to register his device. In step 206, the user registers the authentication factor on the device 15, e.g., by entering a user-created password or using biometrics. In step 207, a cryptographic key pair is created within the secure container of the device. The private key of the key pair is stored in a secure area of the device and is not revealed during the authentication process described with reference to FIG. 2A. The public key includes the device ID the key ID and, in some embodiments, data describing the location of the device 15 at the time of registration.

In connection with the registration process, the application installed on device 15, in conjunction with the risk engine 30, calculates a device authentication weight in step 208. The device authentication weight may be calculated based on several factors, in the preferred embodiment.

One factor relates to location using, for example, parameters obtained by the application (e.g., geolocation, time) upon registration. The location of both the device conducting the registration process and the device to be registered is relevant to the process. For example, the system will consider whether the user should be permitted to register a device that is not within reasonable proximity to the device the user is using to perform the registration. In a particular example, if the user is logged onto his laptop in New York when he seeks to register his mobile phone, registration may be denied if the same user attempts to download the application and register his mobile phone from a location in Europe within a few minutes after his New York laptop logon, as this would indicate an impossible velocity (i.e., traveling to Europe from New York in minutes).

With regard to another factor, the more secure the authentication capability of the device sought to be registered, the higher the weight that is assigned. For example, the risk engine 30 assigns a weight based on the authentication factor provided, e.g., a biometric factor that is hardware-based and backed with a key stored in the secure container of the device would be considered more trusted than a password. Biometric factors in particular may be weighted based on established industry rating: For example, iris scanners have fewer false positives then vein scanners and, thus, would be given a higher weight. Thus, in an exemplary embodiment, the weighting order from high to low is iris scanner, vein scanners, touch identification, pass phrases, and then passwords.

Another factor relates to how secure the device is with regard to storing private keys and whether there are any known leaks or vulnerabilities. So, for example, touch identification sensors have operating system and hardware backing to ensure that the private keys are never accessed by the software and that they are fully stored and operate within the hardware. Certain iris scanner implementations, on the other hand, may have a higher perceived security rating but the key management used in connection with such implementations is fully software-based and, thus, the private key is exposed to the software before being committed to storage. An iris scanner implementation that takes advantage of hardware security may have a higher security rating than touch identification.

It should be noted that a device sought to be registered need not be an integrated device. For example, the user can leverage externally available devices for biometric authentication that connect to their devices, directly or via a wireless capability and using known interfaces.

The registration process for the device is then complete and the device sends the following data elements to the authentication server 20, in the exemplary embodiment: the user identifier, e.g., his electronic mail address; unique registration code; public key; and the device authentication weight. In step 209, the user/device record is updated in database 40.

The user may register more than one device 15 pursuant to the foregoing registration process. Each device 15 is associated with its own unique public/private key relationship and a distinct key ID. With regard to registration of multiple devices, the authentication weight is based on login context and is device-specific. More particularly, a device at rest (e.g., a registered device that is offline or is online but not being used) does not contribute to the weight logic. A user can initiate login via a first device and an authentication weight is assigned to that specific transaction based on use of the first device. If a user seeks to login from a second device, an authentication weight is calculated based on this new authentication request from the second device (e.g., based on location, time, and other factors described previously).

Figure 2B:
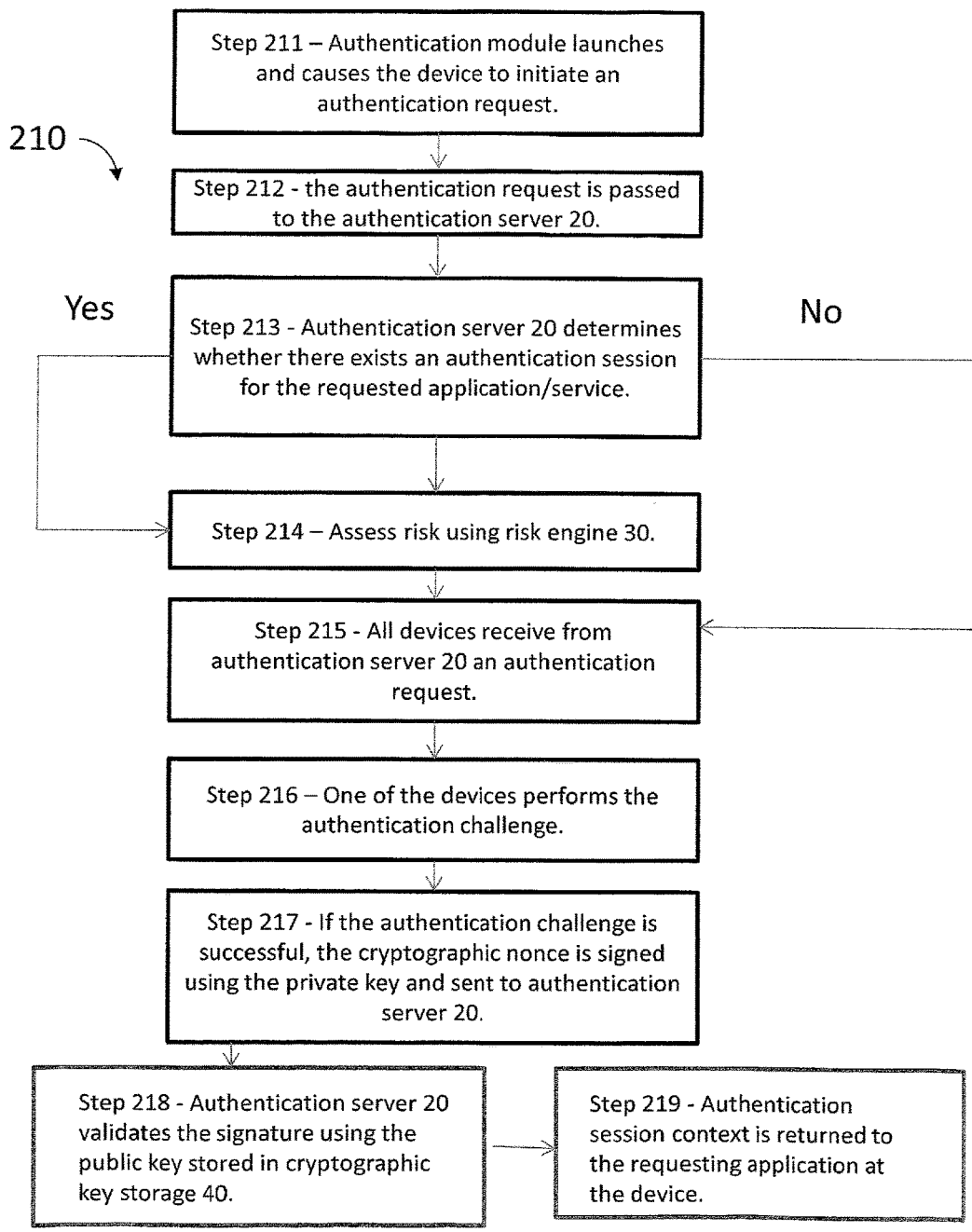
FIG. 2B is a diagram illustrating the flow of data and communications between and among devices and other computer system components in connection with an exemplary authentication process of the present invention.

With reference to FIG. 2B, an exemplary method 210 is illustrated in which the system of the present invention processes a log-in request. The process begins when a user attempts to access a desired computer program using a device. Access may be sought by the user to a native or web application on a mobile device; to a native or web application on a desktop computer; to a server application or service; or to an operating system, e.g., of a smart device, by way of example.

In some embodiments, each computer program that is to receive the benefit of the authentication techniques of the present invention is required to include an authentication module that launches upon an end user requesting access to the application and, in some instances, upon the end user seeking to perform an activity (e.g., access a resource) within the application. More particularly, for every category of device and computer program (e.g., mobile native applications; mobile web applications; desktop native applications; desktop web applications; desktop plug-in; and access to servers and/or operating systems), an entry point is created that translates the device/application's user interface/access control into the ability to communicate with authentication server 20. This allows single sign-on to all such computer programs across all platforms/devices/services.

Where the creator of the computer program is also the sponsor of the authentication technique, the authentication module may be written into the code associated with logging into the computer program. However, an entry point for coding the authentication module is needed for third party computer programs (i.e., those that are not created by the sponsor of the authentication technique, such as applications that are native to a mobile device). Such third parties may allow users of the computer program to customize the log-in page of the computer program (e.g., to allow for customized branding). Such access may be used as an opening to include code (e.g., HTML or JavaScript code) implementing the authentication module, which then launches when the user requests access to the computer program.

Referring now to the steps of the exemplary method illustrated with reference to FIG. 2B, in step 211, when a user requests access to a computer program, identifying himself to the computer program by, e.g., entering his user name, the authentication module launches and causes the device to initiate an authentication request. In step 212, the authentication request is passed to the authentication server 20. In step 213, the authentication server 20 determines if the user must authenticate or if a previous authentication can be trusted. More particularly, authentication server 20 determines whether there exists an authentication session for the user (i.e., an existing session that has not yet expired or purged). By way of example, assume a user employing a first device logs into the computer program. The authentication server 20 maintains a record of that the user logged into the computer program using a first device, at a particular location. This record remains valid for the duration of the maximum session length as configured by the administrator and would be either purged automatically or upon the next login if the maximum session length was exceeded. At the next login, assuming the user is logging in from a different device, the device identifier for the second device, the location of the second device and the identity of the target computer program are made available. The authentication sever 20 uses the data from the previous login, and from the current login attempt, to perform the velocity calculation and application risk scoring and can determine if the user should be permitted to login or if additional authentication is required.

If a session does not exist, one must be established. A process for establishing the session is described in more detail with reference to steps 215 through 219.

However, even if an authentication session exists, risk associated with the newly requested access is still assessed (e.g., because the existing authentication session may have required less security requirements than the application currently sought to be accessed would require) in step 214, as follows.

The risk engine first considers the minimum authentication weight associated with the computer program sought to be accessed, or the resource within the computer program sought to be accessed, or activity to be performed with regard to the computer program. Risk engine 30 consults rules/weights database 45 for this purpose. For example, critical computer programs/applications may be associated with a higher minimum authentication weight than non-critical computer programs/applications. By way of further example, a request to log-in to a computer program/application may be associated with a lower minimum authentication weight than a request to complete a transaction using the application, or a request to access a resource within the application.

If the device authentication weight assigned during the registration process is lower than the minimum authentication weight, the risk engine 30 requires an authentication step.

If the device authentication weight assigned during the registration process is the same or higher than the minimum authentication weight, the risk engine 30 considers: the location of the device seeking access to the application; the time that has elapsed since the most recent authentication; and/or the device being used to seek access to the application (e.g., is it the same device that was used during the registration process).

Thus, the risk engine 30 may consider whether the device is being used within a trusted location proximity (e.g. home or office, at a hotel, at a conference center that is associated with the firm or entity hosting the application, or at a public place within a country where the firm and the user typically reside). The risk engine 30 may further take into account whether the user is located in a foreign country where the firm does business or otherwise. In one exemplary embodiment, the user can inform the risk engine 30 of an anticipated location and obtain pre-approval to reduce impact on the weight, accordingly.

In some embodiments, the velocity of user movement is taken into account. For example, assume a user logs in to an application successfully from New York City and a session is granted. It is estimated that it will take at least 6 hours to travel to the United Kingdom; thus, if a user attempts a login from London 30 minutes after the New York City login, then the score will be reduced due to an impossible velocity. In an exemplary embodiment, the risk engine 30 assigns a default user maximum velocity of 600 miles per hour. With this model, a velocity of 700 miles per hour is possible, but less likely. A velocity of 800 miles per hour would reduce the score even further and a velocity of 1200 miles per hour would render the score zero and an immediate login failure would result.

In another example, the fact that a device is being used that is different from the device that logged into the application the first time is a negative factor in the weighting calculation, in one embodiment.

Based on these considerations, the risk engine 30 determines the risk score accordingly and indicates to the authentication server 20 whether the user should be permitted access to the application or whether another authentication step is required.

If the risk assessment indicates that authentication should be revalidated, despite an existing authentication session, the process continues as described in steps 215 through 219. In some embodiments, the user is provided with a one-time password that is used in connection with the additional authentication step, as described in more detail below.

In the event authentication is required, all device(s) 15 registered with the system (e.g., by way of the process described with reference to FIG. 2A) receive from authentication server 20 an authentication request, in step 215. For example, all the registered devices 15 receive a notification as supported by the particular device platform. Upon the user activating the notification from one of the devices that has received the notification, only that device can be used to fulfill the authentication request, using the authentication module. The authentication request includes a cryptographic nonce. Device(s) 15 performs the authentication challenge, in step 216 (e.g., fingerprint scan or entering of password) and the end user inputs the one-time password. If the authentication challenge is successful, the cryptographic nonce is signed using the private key and sent to authentication server 20, in step 217. In step 218, authentication server 20 validates the signature using the public key stored in cryptographic key storage 40. In step 219, an authentication session context is returned to the requesting computer program/application at device 10 (or device 15 if the requesting device is a registered device). The user employing device 10 (or device 15) may then be redirected/given access to the desired computer program/application.

In some instances, the user has successfully logged into the application and, once within that application, the user desires to access a resource within the application, e.g., perform some activity within the application. The framework of the present invention can be used to assess whether the resource can be accessed within the existing authentication session, or whether the risk associated with the requested resource requires additional authentication. For example, the user may have been permitted to log on to the application using an existing authentication session (e.g., due to the low-risk nature of the application upon log-in), but now seeks to complete a transaction which may be associated with more risk. The risk engine 30 may be used to determine whether the desired activity (e.g., a transaction) can be permitted or if further validation of credentials is required. To accomplish this, the functionality of the risk engine 30 is extended to the activity portion of the application such that the risk engine will be employed to assess the risk associated with the desired activity. In one embodiment, the functionality of the risk engine may be made available to the application as an application programming interface (API). When the user indicates, within the application, a desire to perform a particular activity, the application invokes the authenticator API, which calls the authentication server 20, invoking the functionality of the risk engine 30 to assess the risk associated with the transaction. More particularly, the authentication server 20 identifies the end user, creates a one-time password, and sends it back to the API where the application displays the one-time password via the accessing application. In parallel, the authentication server 20 initiates a notification to the end user's registered device(s) 15. Any registered device 15 that is online receives and displays the notification. The user chooses one device and initiates authentication (using touch identification, for example, plus validating the previously provided one-time password). The authentication server 20 receives the registered device decision (i.e., yes or no), adds to it the decision of the risk engine 30, and then responds back to the API with a signed session token, authorizing the request or declining it. The API responds, accordingly, to the application. As described above, different types of transactions desired by the user may be assigned different weights and those weights are used in connection with the risk assessment.

Embodiments of the present invention involve improvements over existing systems and solve several technical problems present in the prior art. For example, in existing solutions that offer single sign-on between, e.g., native applications and Web applications, if a shared session context exists, it is reused. In connection with the present invention, the risk engine determines if a new authentication session is required before providing access. This improves the functioning of the computer technology because it allows for tying-in of previous authentication events with a new authentication event in a continuous fashion as the user moves from one application to another and from one device to another. Further, at the completion of any successful authentication event, an industry standard security token is generated (e.g., a SAML or OAUTH token) for each single sign-one request. These tokens are accepted by the majority of the applications, their content is signed and they are single-use only. The present invention does not rely on preexisting authenticated keys that continue to be shared. All end users have their own set of keys, established through the registration process as previously described. This improves the functioning of the computer technology because it asserts the user identity across multiple devices using hardware-stored cryptography in a non-refutable way. Still further, embodiments of the present invention represent improvements over the prior art because the present invention does not involve a mere binary decision as to whether to grant access based on the session context. In connection with embodiments of the present invention, the context of entitlement to access is considered at the same time as authentication or even after authentication (e.g., at the time of the request to access). This represents a significant improvement over the prior art because the continuous consideration of factors (such as device type, location and application context awareness) increases the usefulness of the platform because it allows platform architects to easily combine applications of different risk levels without compromising security.

The solution allows for cryptographic trust of the user identity without hosting any user biometrics or other identity information on the backend. It also allows for single sign-on to multiple applications, across multiple devices (including mobile devices), applications and services, while controlling and managing associated risk.

Exemplary use cases of the present invention are described in the following.

Data describing a request to access a computer program is received at a processing component from a requesting device operated by an end user. The requesting device may be a registered device or may be another device.

The processing component determines whether an existing authentication session for the end user exists. The existing authentication session may have been previously established in one of several different ways.

For example, the end user may have authenticated (e.g., using biometrics or a password) to a registered device prior to or at the beginning of the end user's work day (e.g., at home before he leaves for the office or during his commute). Having done so, the end user may be able seamlessly and automatically access all the applications needed throughout his work day, without having to log-in/authenticate again, assuming the risk engine makes that determination in accordance with its assessment (e.g., that the end user's location upon authenticating to his registered device is within a reasonable distance from his office; the time of the authentication is within the same work day; and the applications sought to be accessed by the end user throughout his work day are not highly sensitive/critical from a security perspective).

In another example, the existing authentication session may have been established by the end user by logging into a computer application in a typical manner (e.g., username and password), or by the end user authenticating to a registered device in response to a prompt by the authentication server 20 in a prior session. In each such case, the existing authentication is assessed, as described in more detail herein, in terms of how it was established (e.g., modality of authentication, including the device used to authenticate; the location and time of authentication, and the computer program accessed) in connection with determining whether a new authentication is required for the current access request.

Returning back now to the flow, in accordance with a determination that the existing authentication session for the end user does not exist, the end user is prompted to authenticate. This can be accomplished in the typical way the end user accesses the computer program (e.g., via user name and password) or using registered device 15, in the manner described herein.

In accordance with a determination that the existing authentication session for the end user exists, it is determined whether one or more request characteristics meet one or more computer program access criteria.

The request characteristics may include a device authentication weight. The device authentication weight may be calculated based on a modality by which the end user authenticates to the registration device (e.g., biometrics or password), and/or a security assessment of the registration device (e.g., how secure is the device generally). Thus, for example, if the device is generally secure (e.g., no known leaks or access vulnerabilities) and the end user authenticated to the device during registration using biometrics, the device authentication weight will be higher. In this way, for example, if the existing authentication session was created while employing a device with a higher authentication weight, it may be more likely that re-authentication is not required for a currently requested access to a computer program.

The request characteristics may also include a location of the requesting device. For example, it may be considered whether the end user is making a request from a location that is reasonably and realistically close in proximity to the location of a prior log in/establishment of the existing authentication session. The request characteristic may also include an assessment of the time that has elapsed between the establishment of the existing authentication session and the current access request (e.g., whether too much time has passed).

The computer program access criteria may comprise a minimum authentication weight associated with the computer program sought to be accessed, which may be determined based on a criticality of the computer application (e.g., computer applications that are more sensitive or critical from a security perspective will be weighted higher and, thus, have more stringent authentication requirements).

In accordance with a determination that the one or more request characteristics meet the one or more computer program access criteria, the requesting device is provided with access to the computer program. From the end user perspective, the access is seamlessly and automatically provided, without further authentication by the end user.

In accordance with a determination that the one or more request characteristics do not meet the one or more computer program access criteria, the end user is prompted to perform an authentication activity. In response to receiving data indicating that the end user performed the authentication activity (e.g., biometrics data of the end user or a password selected by the end user; and in some instances a one-time password provided by the processing component after receiving the request to access from the requesting device), a new authentication session is established for the end user and the requesting device is provided with access to the computer program.

In one example, the consideration of the request characteristics and computer program access criteria dictate that the determination of the risk assessment is negative when the device authentication weight does not exceed a minimum authentication weight associated with the computer program (e.g., the manner of authenticating to the registered device, and/or the registered device itself, is not sufficiently secure).

In another example, the consideration of the request characteristics and computer program access criteria dictate that the determination of the risk assessment is negative when a distance between a first location of the requesting device when the request to access was sent and a second location of another device when the existing authentication session was created exceeds a distance threshold (e.g., the end user could not have traveled the distance between the location where the existing authentication session was created to the location where the request for access was made within the passing time period).

In some embodiments, the consideration of the request characteristics and computer program access criteria dictate that the determination of the risk assessment is negative when a time period between a first time when the request to access was sent and a second time when the existing authentication session was created exceeds a time period threshold (e.g., too much time has passed between when the end user created the authentication session and when the end user requested access to the computer program).

Figure 3:
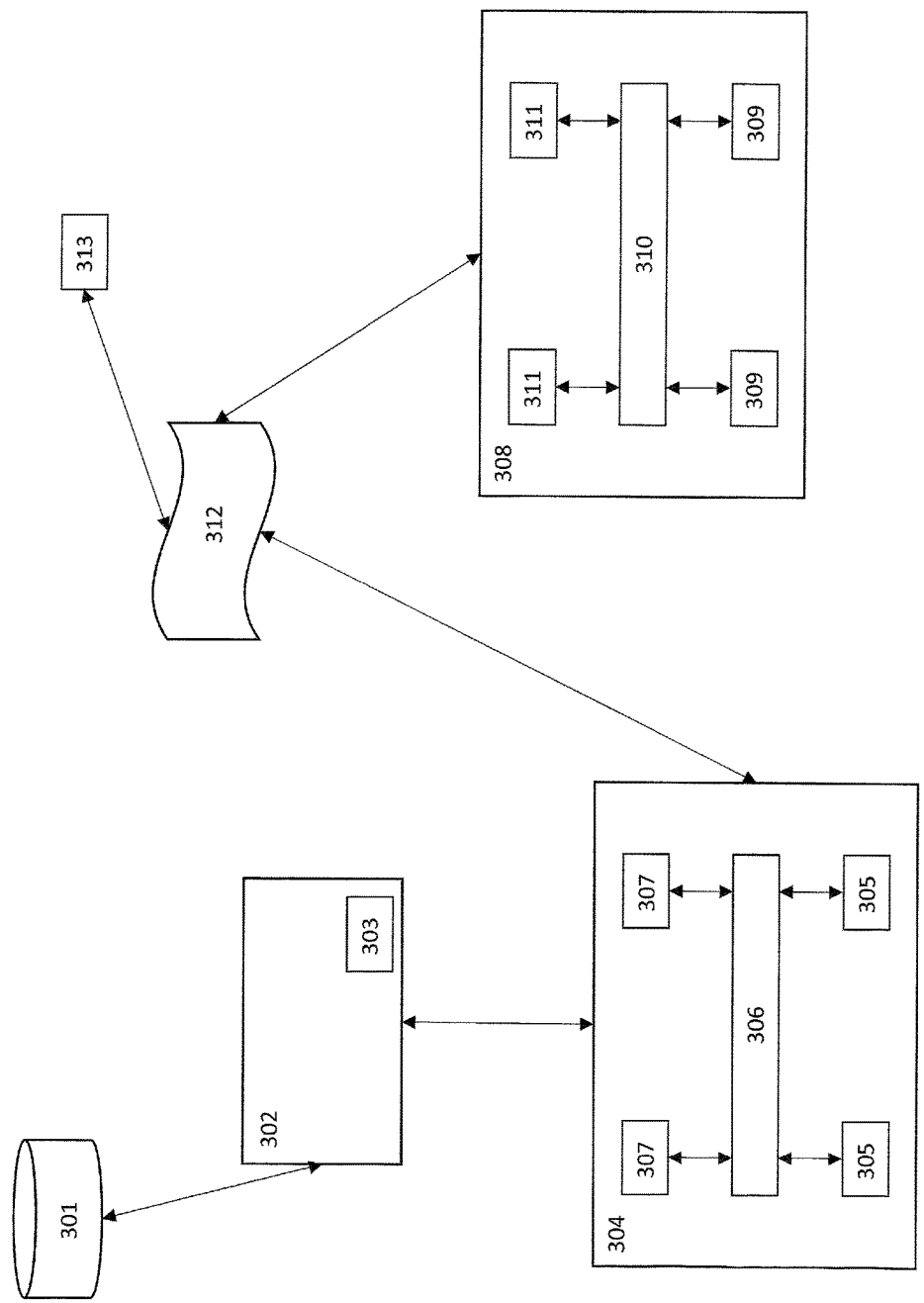
FIG. 3 is a diagram illustrating an exemplary computer system architecture that may be used in accordance with the present invention.

The exemplary methods of embodiments of the present invention may be carried out by a system that employs a client/server architecture such as, for example, the collection of components illustrated and described with reference to FIG. 1. Such exemplary embodiments are described in more detail as follows with reference to FIG. 3. The data that may be used as an input to the system, and the outputs from the system, may be stored in one or more databases 301 (e.g., rules/weights storage 45, or crypto storage 40). Database server(s) 302 may include a database services management application 303 that manages storage and retrieval of data from the database(s) 301. The databases 301 may be relational databases; however, other data organizational structures may be used without departing from the scope of the present invention.

One or more application server(s) 304 (e.g., authentication server 20 and/or risk engine 30) are in communication with the database server 302. The application server 304 communicates requests for data to the database server 302. The database server 302 retrieves the requested data. The application server 304 may also send data to the database server 302 for storage in the database(s) 301. The application server 304 comprises one or more processors 305, non-transitory computer readable storage media 307 that store programs (computer readable instructions) for execution by the processor(s), and an interface 306 between the processor(s) 305 and computer readable storage media 307. The application server 304 may store the computer programs referred to herein.

To the extent data and information is communicated over a network (e.g., the Internet or an Intranet), one or more network servers 308 may be employed. The network server 308 also comprises one or more processors 309, computer readable storage media 311 that store programs (computer readable instructions) for execution by the processor(s), and an interface 310 between the processor(s) 309 and computer readable storage media 311. The network server 308 is employed to deliver content that can be accessed through the communications network 312, e.g., by an end user employing computing device 313 (e.g., device(s) 10, 15). When data is requested through an application, such as an Internet browser, the network server 308 receives and processes the request. The network server 308 sends the data or application requested along with user interface instructions for displaying a user interface on device 313 (e.g., device(s) 10, 15).

The computers referenced herein are specially programmed to perform the functionality described herein.

The non-transitory computer readable storage media (e.g., 307 or 311) that store the programs (i.e., software modules comprising computer readable instructions) may include volatile and non-volatile, removable and non-removable media implemented in any method or technology for storage of information such as computer-readable instructions, data structures, program modules, or other data. Computer readable storage media may include, but is not limited to, RAM, ROM, Erasable Programmable ROM (EPROM), Electrically Erasable Programmable ROM (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computer system and processed.

In at least one embodiment, there is included one or more computers having one or more processors and memory (e.g., one or more nonvolatile storage devices). In some embodiments, memory or computer readable storage medium of memory stores programs, modules and data structures, or a subset thereof for a processor to control and run the various systems and methods disclosed herein. In one embodiment, a non-transitory computer readable storage medium having stored thereon computer-executable instructions which, when executed by a processor, perform one or more of the methods disclosed herein.

It will be appreciated by those skilled in the art that changes could be made to the exemplary embodiments shown and described above without departing from the broad inventive concept thereof. It is understood, therefore, that this invention is not limited to the exemplary embodiments shown and described, but it is intended to cover modifications within the spirit and scope of the present invention as defined by the claims. For example, specific features of the exemplary embodiments may or may not be part of the claimed invention and features of the disclosed embodiments may be combined. Unless specifically set forth herein, the terms "a", "an" and "the" are not limited to one element but instead should be read as meaning "at least one".

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are well known in the art, and because they do not necessarily facilitate a better understanding of the invention, a description of such elements is not provided herein.

Further, to the extent that the method does not rely on the particular order of steps set forth herein, the particular order of the steps should not be construed as limitation on the claims. The claims directed to the method of the present invention should not be limited to the performance of their steps in the order written, and one skilled in the art can readily appreciate that the steps may be varied and still remain within the spirit and scope of the present invention.

What is claimed is:

1. A computerized method comprising:
   receiving at the processing component, a registration request from the end user;
   creating by the processing component a unique registration token;
   creating by the processing component a database record including an identifier for the end user and the unique registration token;
   providing by the processing component to a registration device a mechanism to access an authentication application for initiating registration of the registration device;
   receiving, through the authentication application, from the end user, the identifier for the end user and the unique registration token;
   collecting an identifier associated with the registration device;
   receiving from the registration device a public key, the public key forming a portion of a cryptographic key pair, the cryptographic key pair being created upon the end user authenticating to the registration device, wherein the registration device stores a private key of the cryptographic key pair;
   calculating by the processing component a device authentication weight;
   storing in a database by the processing component the public key and the device authentication weight;
   receiving at a processing component, from a requesting device operated by an end user, data describing a request to access a computer program;
   determining by the processing component whether an existing authentication session for the end user exists;
   in accordance with a determination that the existing authentication session for the end user does not exist, prompting the end user to authenticate to the processing component;
   in accordance with a determination that the existing authentication session for the end user exists, performing a risk assessment comprising a consideration of one or both of (i) one or more request characteristics associated with the request to access the computer program and (ii) one or more computer program access criteria;
   in accordance with a determination that the risk assessment is positive, providing the requesting device with access to the computer program;
   in accordance with a determination that the risk assessment is negative, prompting the end user to perform an authentication activity and, in response to receiving data indicating that the end user performed the authentication activity and the authentication activity is successful, establishing a new authentication session for the end user and providing the requesting device with access to the computer program.

2. The computerized method of claim 1 wherein the data indicating that the end user performed the authentication activity comprises biometrics data of the end user.

3. The computerized method of claim 1 wherein the data indicating that the end user performed the authentication activity comprises a password selected by the end user.

4. The computerized method of claim 1 wherein the data indicating that the end user performed the authentication activity comprises a one-time password provided by the processing component after receiving the request to access from the requesting device.

5. The computerized method of claim 1 wherein, before the receiving data describing a request to access a computer program step, the existing authentication session for the end user is established using the registration device.

6. The computerized method of claim 1 wherein the requesting device comprises the registration device.

7. The computerized method of claim 1 wherein the requesting device comprises a device other than the registration device.

8. The computerized method of claim 1 wherein the consideration of the one or more of the computer program access criteria dictate that the determination of the risk assessment is negative, regardless of the consideration of the one or more request characteristics.

9. The computerized method of claim 1 wherein the consideration of the one or more of the request characteristics dictate that the determination of the risk assessment is negative, regardless of the consideration of the one or more computer program access criteria.

10. The computerized method of claim 1 wherein the one or more computer program access criteria comprise a minimum authentication weight associated with the computer program.

11. The computerized method of claim 1 wherein the one or more request characteristics comprise the device authentication weight.

12. The computerized method of claim 1 wherein the one or more request characteristics comprise a location of the requesting device.

13. The computerized method of claim 1 wherein the one or more request characteristics comprise a time that has elapsed since the existing authentication session was established.

14. The computerized method of claim 1 wherein the one or more request characteristics comprise whether the requesting device is the registration device.

15. The computerized method of claim 1 wherein the device authentication weight is calculated based on a modality by which the end user authenticates to the registration device.

16. The computerized method of claim 1 wherein the device authentication weight is calculated based on a security assessment of the registration device.

17. The computerized method of claim 10 wherein the minimum authentication weight is determined based on a criticality of the computer program.

18. The computerized method of claim 1 wherein the processing component receives the public key in connection with the end user performing the authentication activity.

19. The computerized method of claim 1 further comprising:
receiving at the processing component, from the requesting device, data describing a request to access a resource within the computer program; and
determining whether one or more request characteristics meet one or more computer program resource access criteria, wherein the one or more computer program resource access criterial comprise a minimum authentication weight associated with the resource.

20. The computerized method of claim 1 wherein the existing authentication session is established in connection with the end user accessing another computer program that is not the subject of the request to access.

21. The computerized method of claim 19 wherein the one or more request characteristics comprise a modality in which the existing authentication session in connection with accessing the other computer program was established.

22. The computerized method of claim 1, wherein the computer program is a native application.

23. The computerized method of claim 1, wherein the computer program is a web-based application.

24. The computerized method of claim 1, wherein the computer program is an operating system of the requesting device.

25. The computerized method of claim 1, wherein the consideration of the one or more of the request characteristics and computer program access criteria dictate that the determination of the risk assessment is negative when the device authentication weight does not exceed a minimum authentication weight associated with the computer program.

26. The computerized method of claim 1, wherein the consideration of the one or more of the request characteristics and computer program access criteria dictate that the determination of the risk assessment is negative when a distance between a first location of the requesting device when the request to access was sent and a second location of another device when the existing authentication session was created exceeds a distance threshold.

27. The computerized method of claim 1, wherein the consideration of the one or more of the request characteristics and computer program access criteria dictate that the determination of the risk assessment is negative when a time period between a first time when the request to access was sent and a second time when the existing authentication session was created exceeds a time period threshold.

28. A system comprising:
a processing component configured to:
receive at the processing component, a registration request from the end user;
create by the processing component a unique registration token;
create by the processing component a database record including an identifier for the end user and the unique registration token;
provide by the processing component to a registration device a mechanism to access an authentication application for initiating registration of the registration device;
receive, through the authentication application, from the end user, the identifier for the end user and the unique registration token;
collect an identifier associated with the registration device;
receive from the registration device a public key, the public key forming a portion of a cryptographic key pair, the cryptographic key pair being created upon the end user authenticating to the registration device, wherein the registration device stores a private key of the cryptographic key pair;
calculate by the processing component a device authentication weight;
store in a database by the processing component the public key and the device authentication weight;
receive, from a requesting device operated by an end user, data describing a request to access a computer program;
determine whether an existing authentication session for the end user exists;
in accordance with a determination that the existing authentication session for the end user does not exist, prompt the end user to authenticate to the processing component;
in accordance with a determination that the existing authentication session for the end user exists, perform a risk assessment comprising a consideration of one or both of (i) one or more request characteristics and (ii) one or more computer program access criteria;
in accordance with a determination that the risk assessment is positive, providing the requesting device with access to the computer program;
in accordance with a determination that the risk assessment is negative, prompting the end user to perform an authentication activity and, in response to receiving data indicating that the end user performed the authentication activity and the authentication activity is successful, establishing a new authentication session for the end user and providing the requesting device with access to the computer program.

* * * * *